United States Patent
Malone et al.

(10) Patent No.: US 10,153,954 B2
(45) Date of Patent: Dec. 11, 2018

(54) INFERRING PHYSICAL LAYER CONNECTION STATUS OF GENERIC CABLES FROM PLANNED SINGLE-END CONNECTION EVENTS

(71) Applicants: CommScope Technologies LLC, Hickory, NC (US); CommScope Connectivity UK Limited, London (GB)

(72) Inventors: Gene Malone, Kernersville, NC (US); Andrew P. Roberts, Wrexham (GB); Peter Smith, Chester (GB); Eric W. Sybesma, Minneapolis, MN (US)

(73) Assignees: CommScope Technologies LLC, Hickory, NC (US); CommScope Connectivity UK Limited, London (GB)

( * ) Notice: Subject to any disclaimer, the term of this patent is extended or adjusted under 35 U.S.C. 154(b) by 499 days.

(21) Appl. No.: 14/458,974

(22) Filed: Aug. 13, 2014

(65) Prior Publication Data
US 2015/0052272 A1    Feb. 19, 2015

Related U.S. Application Data

(60) Provisional application No. 61/865,709, filed on Aug. 14, 2013.

(51) Int. Cl.
*G06F 13/20*     (2006.01)
*H04L 12/26*     (2006.01)
(Continued)

(52) U.S. Cl.
CPC ........ *H04L 43/0811* (2013.01); *G06F 13/364* (2013.01); *H04L 41/24* (2013.01)

(58) Field of Classification Search
USPC .......... 710/104–117, 305–314; 709/223–229
See application file for complete search history.

(56) References Cited

U.S. PATENT DOCUMENTS 3,052,842 A    9/1962   Frohman et al.
3,573,789 A    4/1971   Sharp et al.
(Continued)

FOREIGN PATENT DOCUMENTS

DE    3918144    12/1990
EP    317852    5/1989
(Continued)

OTHER PUBLICATIONS

International Searching Authority, "International Search Report from PCT Application PCT/US2014/050919 dated Nov. 27, 2014", "from Foreign Counterpart Application No. 14/158,974", dated Nov. 27, 2014, pp. 1-14, Published in: WO.
(Continued)

*Primary Examiner* — Raymond N Phan
(74) *Attorney, Agent, or Firm* — Fogg & Powers LLC (57) ABSTRACT

A work order is generated. The work order comprises a first work order step specifying that a port of a first network element is to be connected to a port of a second network element using a cable. The first and second network elements are configured to detect when connections are made at the specified ports of the first network element and the second network element. A management system is configured to update information it maintains to indicate that there is a connection between the specified port of the first network element and the specified port of the second network element if connections made at the specified ports of the first and second network elements are detected during a period in which the first work order step of the first work
(Continued)

order is expected to be performed. A similar technique can be used for disconnecting a cable.

40 Claims, 3 Drawing Sheets

(51) Int. Cl.
  *G06F 13/364* (2006.01)
  *H04L 12/24* (2006.01)

(56) References Cited

U.S. PATENT DOCUMENTS

| | | |
|---|---|---|
| 3,573,792 A | 4/1971 | Reed |
| 3,914,561 A | 10/1975 | Schardt et al. |
| 4,018,997 A | 4/1977 | Hoover et al. |
| 4,072,827 A | 2/1978 | Oman |
| 4,096,359 A | 6/1978 | Barsellotti |
| 4,140,885 A | 2/1979 | Verhagen |
| 4,196,316 A | 4/1980 | McEowen et al. |
| 4,724,435 A | 2/1988 | Moses et al. |
| 4,773,867 A | 9/1988 | Keller et al. |
| 4,796,294 A | 1/1989 | Nakagawara |
| 4,833,708 A | 5/1989 | Goodrich |
| 4,840,568 A | 6/1989 | Burroughs et al. |
| 4,901,004 A | 2/1990 | King |
| 4,916,444 A | 4/1990 | King |
| 4,953,194 A | 8/1990 | Hansen et al. |
| 4,968,929 A | 11/1990 | Hauck et al. |
| 5,052,940 A | 10/1991 | Bengal |
| 5,107,532 A | 4/1992 | Hansen et al. |
| 5,111,408 A | 5/1992 | Amjadi |
| 5,145,380 A | 9/1992 | Holcomb et al. |
| 5,161,988 A | 11/1992 | Krupka |
| 5,166,970 A | 11/1992 | Ward |
| 5,170,327 A | 12/1992 | Burroughs |
| 5,195,902 A | 3/1993 | Bengal |
| 5,233,501 A | 8/1993 | Allen et al. |
| 5,265,187 A | 11/1993 | Morin et al. |
| 5,305,405 A | 4/1994 | Emmons et al. |
| 5,353,367 A | 10/1994 | Czosnowski et al. |
| 5,394,503 A | 2/1995 | Dietz, Jr. et al. |
| 5,418,334 A | 5/1995 | Williams |
| 5,420,512 A | 5/1995 | Spillane et al. |
| 5,432,847 A | 7/1995 | Hill et al. |
| 5,448,675 A | 9/1995 | Leone et al. |
| 5,461,693 A | 10/1995 | Pimpinella |
| 5,463,706 A | 10/1995 | Dumont et al. |
| 5,473,715 A | 12/1995 | Schofield et al. |
| 5,475,732 A | 12/1995 | Pester, III |
| 5,483,467 A | 1/1996 | Krupka |
| 5,487,666 A | 1/1996 | DiGiovanni |
| 5,523,747 A | 6/1996 | Wise |
| 5,541,586 A | 7/1996 | Wise |
| 5,546,282 A | 8/1996 | Hill et al. |
| 5,550,755 A | 8/1996 | Martin et al. |
| 5,606,664 A | 2/1997 | Brown et al. |
| 5,631,902 A | 5/1997 | Yoshifuji |
| 5,726,635 A | 3/1998 | Tsuhara et al. |
| 5,727,055 A | 3/1998 | Ivie et al. |
| 5,754,112 A | 5/1998 | Novak |
| 5,764,043 A | 6/1998 | Czosnowski et al. |
| 5,774,245 A | 6/1998 | Baker |
| 5,790,041 A | 8/1998 | Lee |
| 5,793,909 A | 8/1998 | Leone et al. |
| 5,802,143 A | 9/1998 | Borchering et al. |
| 5,818,128 A | 10/1998 | Hoffmann et al. |
| 5,821,510 A | 10/1998 | Cohen et al. |
| 5,821,760 A | 10/1998 | Koeman et al. |
| 5,832,071 A | 11/1998 | Voelker |
| 5,854,824 A | 12/1998 | Bengal et al. |
| 5,876,240 A | 3/1999 | Derstine et al. |
| 5,915,993 A | 6/1999 | Belopolsky et al. |
| 5,929,425 A | 7/1999 | Kanno |
| 5,944,535 A | 8/1999 | Bullivant et al. |
| 5,954,829 A | 9/1999 | McLain, Jr. et al. |
| 5,982,744 A | 11/1999 | Cantwell et al. |
| 6,002,331 A | 12/1999 | Laor |
| 6,002,692 A | 12/1999 | Wills |
| 6,086,415 A | 7/2000 | Sanchez et al. |
| 6,222,908 B1 | 4/2001 | Bartolutti et al. |
| 6,234,830 B1 | 5/2001 | Ensz et al. |
| 6,238,235 B1 | 5/2001 | Shavit et al. |
| 6,263,061 B1 | 7/2001 | Tanaka et al. |
| 6,285,293 B1 | 9/2001 | German et al. |
| 6,300,877 B1 | 10/2001 | Schannach et al. |
| 6,330,307 B1 | 12/2001 | Bloch et al. |
| 6,350,148 B1 | 2/2002 | Bartolutti et al. |
| 6,359,859 B1 | 3/2002 | Brolin et al. |
| 6,421,322 B1 | 7/2002 | Koziy et al. |
| 6,424,710 B1 | 7/2002 | Bartolutti et al. |
| 6,499,861 B1 | 12/2002 | German et al. |
| 6,522,737 B1 | 2/2003 | Bartolutti et al. |
| 6,574,586 B1 | 6/2003 | David et al. |
| 6,577,243 B1 | 6/2003 | Dannenmann et al. |
| 6,636,152 B2 | 10/2003 | Schannach et al. |
| 6,664,985 B1 | 12/2003 | Bormann et al. |
| 6,684,179 B1 | 1/2004 | David |
| 6,725,177 B2 | 4/2004 | David et al. |
| D510,068 S | 9/2005 | Haggay et al. |
| 6,961,675 B2 | 11/2005 | David |
| 6,968,994 B1 | 11/2005 | Ashwood Smith |
| 6,976,867 B2 | 12/2005 | Navarro et al. |
| 7,038,135 B1 | 5/2006 | Chan et al. |
| 7,042,562 B2 | 5/2006 | Kiani et al. |
| 7,077,710 B2 | 7/2006 | Haggay et al. |
| 7,081,808 B2 | 7/2006 | Colombo et al. |
| 7,123,810 B2 | 10/2006 | Parrish |
| 7,153,142 B2 | 12/2006 | Shifris et al. |
| 7,160,143 B2 | 1/2007 | David et al. |
| 7,193,422 B2 | 3/2007 | Velleca et al. |
| 7,226,217 B1 | 6/2007 | Benton et al. |
| 7,229,020 B2 | 6/2007 | Goodison et al. |
| 7,234,944 B2 | 6/2007 | Nordin et al. |
| 7,289,334 B2 | 10/2007 | Behrens et al. |
| 7,297,018 B2 | 11/2007 | Caveney et al. |
| 7,312,715 B2 | 12/2007 | Shalts et al. |
| D559,186 S | 1/2008 | Kelmer |
| 7,315,224 B2 | 1/2008 | Gurovich et al. |
| D564,966 S | 3/2008 | Shifris |
| 7,352,289 B1 | 4/2008 | Harris |
| 7,377,819 B1 | 5/2008 | Cooper et al. |
| 7,401,985 B2 | 7/2008 | Aronson et al. |
| D575,743 S | 8/2008 | Shifris et al. |
| 7,411,405 B2 | 8/2008 | Nordin |
| 7,445,389 B2 | 11/2008 | Aronson |
| 7,468,669 B1 | 12/2008 | Beck et al. |
| 7,479,032 B2 | 1/2009 | Hoath et al. |
| 7,499,616 B2 | 3/2009 | Aronson et al. |
| 7,509,003 B2 | 3/2009 | Sugiyama |
| 7,517,243 B2 | 4/2009 | Caveney et al. |
| 7,540,667 B2 | 6/2009 | Murano |
| 7,551,456 B2 | 6/2009 | Behrens et al. |
| 7,564,795 B2 | 7/2009 | Stephenson et al. |
| 7,907,537 B2 | 3/2011 | Koziy et al. |
| 8,116,434 B2 | 2/2012 | German et al. |
| 8,643,476 B2 | 2/2014 | Pinn et al. |
| 8,804,540 B2 | 8/2014 | Koziy et al. |
| 9,123,217 B2 | 9/2015 | Pinn et al. |
| 9,338,525 B2 | 5/2016 | Pinn et al. |
| 9,620,941 B2 | 4/2017 | Tucker et al. |
| 9,678,133 B2 | 6/2017 | Enge |
| 9,742,633 B2 | 8/2017 | Koziy et al. |
| 9,811,494 B2 | 11/2017 | Pinn et al. |
| 2005/0186819 A1 | 8/2005 | Velleca et al. |
| 2006/0160395 A1 | 7/2006 | Macauley et al. |
| 2006/0160396 A1 | 7/2006 | Macauley et al. |
| 2007/0117444 A1 | 5/2007 | Caveney et al. |
| 2007/0162954 A1 | 7/2007 | Pela |
| 2007/0230452 A1 | 10/2007 | Hough et al. |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |

(56) References Cited

U.S. PATENT DOCUMENTS

| | | |
|---|---|---|
| 2010/0271182 A1 | 10/2010 | Yashukova |
| 2011/0097925 A1 | 4/2011 | Caveney et al. |
| 2013/0078848 A1 | 3/2013 | Kummetz |
| 2018/0060264 A1 | 3/2018 | Pinn et al. |

FOREIGN PATENT DOCUMENTS

| | | |
|---|---|---|
| EP | 383931 | 8/1990 |
| EP | 687115 | 12/1995 |
| EP | 0700193 | 3/1996 |
| GB | 2236398 | 4/1991 |
| KR | 1020120000064 | 1/2012 |
| WO | 9803022 | 1/1998 |
| WO | 2008066781 | 6/2008 |
| WO | 2010121639 | 10/2010 |

OTHER PUBLICATIONS

U.S. Patent and Trademark Office, "Office Action", "from U.S. Appl. No. 08/972,159", dated Aug. 30, 2000, pp. 1-4, Published in: US.

U.S. Patent and Trademark Office, "Office Action", "from U.S. Appl. No. 08/972,159", dated Feb. 23, 2001, pp. 1-6, Published in: US.

U.S. Patent and Trademark Office, "Advisory Action", "from U.S. Appl. No. 10/017,653", dated Dec. 18, 2007, pp. 1-3, Published in: US.

U.S. Patent and Trademark Office, "Final Office Action", "from U.S. Appl. No. 10/017,653", dated Jul. 12, 2007, pp. 1-9, Published in: US.

U.S. Patent and Trademark Office, "Final Office Action", "from U.S. Appl. No. 10/017,653", dated Oct. 1, 2007, pp. 1-10, Published in: US.

U.S. Patent and Trademark Office, "Notice of Allowance", "from U.S. Appl. No. 10/017,653", dated Dec. 3, 2008, pp. 1-4, Published in: US.

U.S. Patent and Trademark Office, "Office Action", "from U.S. Appl. No. 10/017,653", dated Jan. 24, 2007, pp. 1-9, Published in: US.

U.S. Patent and Trademark Office, "Office Action", dated May 5, 2008, pp. 1-8, Publisher: from U.S. Appl. No. 10/017,653, Published in: US.

U.S. Patent and Trademark Office, "Restriction Requirement", "from U.S. Appl. No. 10/017,653", dated Oct. 5, 2006, pp. 1-5, Published in: US.

U.S. Patent and Trademark Office, "Notice of Allowance", "from U.S. Appl. No. 12/398,509", dated Nov. 12, 2010, pp. 1-13, Published in: US.

U.S. Patent and Trademark Office, "Office Action", "from U.S. Appl. No. 12/398,509", dated May 20, 2010, pp. 1-10, Published in: US.

U.S. Patent and Trademark Office, "Final Office Action", "from U.S. Appl. No. 13/020,843", dated Jan. 7, 2014, pp. 1-9, Published in: US.

U.S. Patent and Trademark Office, "Notice of Allowance", "from U.S. Appl. No. 13/020,843", dated Mar. 31, 2014, pp. 1-7, Published in: US.

U.S. Patent and Trademark Office, "Office Action", "from U.S. Appl. No. 13/020,843", dated Jun. 3, 2013, pp. 1-20, Published in: US.

U.S. Patent and Trademark Office, "Restriction Requirement", "from U.S. Appl. No. 13/020,843", dated Jan. 7, 2013, pp. 1-15, Published in: US.

Intellimac, "The Intelligent way to make Moves, Adds and Changes!", May 2003, pp. 1-6, Publisher: Nordx/CDT.

Meredith, "Managers Missing Point of Intelligent Patching", "http://searchdatacenter.techtarget.com/news/article/0,289142,sid80_gci1099991,00.html", Jun. 21, 2005, pp. 1-2, Publisher: SearchDataCenter.com.

Milligan, "Intelligent Patching Systems Carving Out a 'Large' Niche", "http://www.cablinginstall.com/index/display/article-display/207641/articles/cabling-installation-maintenance/volume-12/issue-7/contents/technology/int", Jul. 1, 2004, pp. 1-6, vol. 12, No. 7, Publisher: Cabling Installation & Maintenance.

INFERRING PHYSICAL LAYER CONNECTION STATUS OF GENERIC CABLES FROM PLANNED SINGLE-END CONNECTION EVENTS

CROSS-REFERENCE TO RELATED APPLICATIONS

This application claims the benefit of U.S. Provisional Patent Application Ser. No. 61/865,709, filed on Aug. 14, 2013, which is hereby incorporated herein by reference.

BACKGROUND

Various types of physical layer management (PLM) technology can be used to track cross connections made at patch panels or other inter-connection devices. Generally, such PLM technology includes functionality to obtain information about what is connected to each service port of a patch panel or other inter-connection device and to communicate that information back to a management system. The management system stores the information and makes it available for various purposes (such as tracing connections and carrying out electronic work orders that specify how one or more connections are to be moved, added, or otherwise changed).

One type of PLM technology makes use of an Electrically Erasable Programmable Read-Only Memory (EEPROM) or other storage device that is integrated with or attached to a connector on a cable. The storage device is used to store an identifier for the cable or connector along with other information. The port (or other connector) into which the associated connector is inserted is configured to read the information stored in the EEPROM when the connector is inserted into the port of patch panel or other network element.

Another type of PLM technology makes use of radio frequency identification (RFID) tags and readers. With RFID technology, an RFID tag is attached to or integrated with a connector on a cable. The RFID tag is used to store an identifier for the cable or connector along with other information. The RFID tag is typically then read using an RFID reader after the associated connector is inserted into a port (or other connector) of a patch panel or other network element.

Both of the PLM technologies described above are examples of "identifier-based" PLM technology that is configured to work with non-standard cables from which identifier or other information can be read. The information read from the cables is used to identify and track connections. However, such PLM technologies are not able to read such information from standard cables and, therefore, typically are not able to identify and track connections made using standard cables.

SUMMARY

One embodiment is directed to a method comprising generating a first work order comprising a first work order step specifying that a port of a first network element is to be connected to a port of a second network element using a cable. The method further comprises detecting, using the first network element, when a connection is made at the specified port of the first network element and detecting, using the second network element, when a connection is made at the specified port of the second network element. The method further comprises, if the first network element detects a connection made at the specified port of the first network element during a period in which the first work order step of the first work order was expected to be performed and the second network element detects a connection made at the specified port of the second network element during the period in which the first work order step of the first work order was expected to be performed, updating a management system to indicate that the specified port of the first network element is connected to the specified port of the second network element.

Another embodiment is directed to a method of identifying a disconnection of a specified port of a first network element from a specified port of a second network element. The method comprises, if after the port of the first network element is connected to the port of the second network element using a cable: generating a first work order comprising a first work order step specifying that the port of the first network element is to be disconnected from the port of the second network element; detecting, using the first network element, when a disconnection is made at the specified port of the first network element, and detecting, using the second network element, when a disconnection is made at the specified port of the second network element. The method further comprises, if the first network element detects a disconnection made at the specified port of the first network element during a period in which the first work order step of the first work order was expected to be performed and the second network element detects a disconnection made at the specified port of the second network element during the period in which the first work order step of the first work order was expected to be performed, updating a management system to indicate that the specified port of the first network element is not connected to the specified port of the second network element.

Another embodiment is directed to a system comprising a first network element comprising at least one port. The first network element is configured to detect when a cable is connected to the port of the first network element. The system further comprises a second network element comprising at least one port. The second network element is configured to detect when a cable is connected to the port of the second network element. The system further comprises a management system communicatively coupled to the first network element and the second network element. The management system is configured to generate a first work order comprising a first work order step specifying that the port of the first network element is to be connected to the port of the second network element using a cable. The management system is configured to update information maintained by the management system to indicate that the specified port of the first network element is connected to the specified port of the second network element if the management system receives a message indicating that a connection was detected at the specified port of the first network element during a period in which the first work order step of the first work order is expected to be performed and receives a message indicating that a connection was detected at the specified port of the second network element during the period in which the first work order step of the first work order was expected to be performed.

Another embodiment is directed to a system comprising a first network element comprising at least one port. The first network element is configured to detect when a cable is disconnected from the port of the first network element. The system further comprises a second network element comprising at least one port. The second network element is configured to detect when a cable is disconnected from the port of the second network element. The system further comprises a management system communicatively coupled to the first network element and the second network element. The management system is configured to generate a first work order comprising a first work order step specifying that the port of the first network element is to be disconnected from the port of the second network element. The management system is configured to update information maintained by the management system to indicate that the specified port of the first network element has been disconnected from the specified port of the second network element if the management system receives a message indicating that a disconnection was detected at the specified port of the first network element during a period in which the first work order step of the first work order was expected to be performed and receives a message indicating that a disconnection was detected at the specified port of the second network element during the period in which the first work order step of the first work order was expected to be performed.

Another embodiment is directed to a program product for identifying a connection between a specified port of a first network element and a specified port of a second network element, tangibly stored on a non-transitory storage medium. The program product comprising instructions operable to cause at least one programmable processor to generate a work order comprising a work order step specifying that the specified port of the first network element is to be connected to the specified port of the second network element using a cable. The program product further comprising instructions operable to cause at least one programmable processor to, in connection with a connection being made at the specified port of the first network element specified in the work order step, receiving information indicating that the connection has been made at the specified port of the first network element and, in connection with a connection being made at the specified port of the second network element, receiving information indicating that the connection has been made at the specified port of the second network element. The program product further comprising instructions operable to cause at least one programmable processor to, if information is received indicating that a connection has been made at the specified port of the first network element during a period in which the work order step of the work order is expected to be performed and information is received indicating that a connection has been made at the specified port of the second network element during the period in which the work order step of the work order is expected to be performed, updating connection information for the first network element and the second network element to indicate that the specified port of the first network element is connected to the specified port of the second network element.

DETAILED DESCRIPTION

Figure 1:
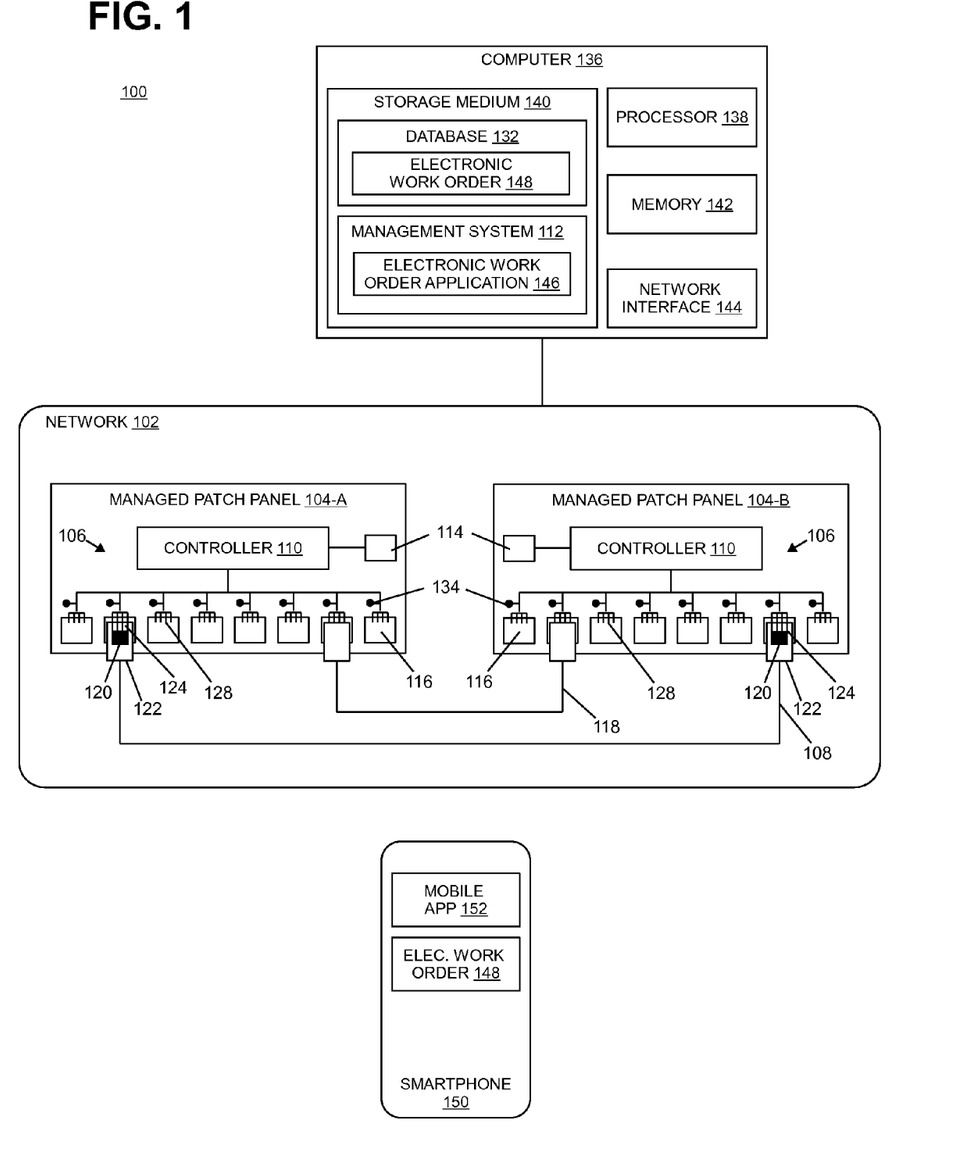
FIG. 1 is a block diagram of one exemplary embodiment of a physical layer management (PLM) system.

FIG. 1 is a block diagram of one exemplary embodiment of a physical layer management (PLM) system 100.

The PLM system 100 is used to track physical layer information related to a network 102. As used herein, "physical layer information" comprises information about the cabling, connections, and communication links that exist in the network 102.

In the exemplary embodiment shown in FIG. 1, the network 102 includes various network elements or devices to which cables are connected. In the exemplary embodiment shown in FIG. 1, the network 102 includes at least some managed network elements or devices 104. As used herein, a "managed" network element or device 104 is a network element or device that includes some type of identifier-based physical layer management (PLM) technology 106 for automatically reading identifier and other physical layer information related to one or more cables that are connected to that device 104. Examples of managed devices 104 include, without limitation, patch panels, optical distribution frames, splitter trays, switches, routers, etc., that include one or more of EEPROM-based PLM technology and RFID PLM technology.

The network 102 also typically includes unmanaged network elements and devices (not shown). As used herein, an "unmanaged" network element or device is a network element or device that does not include any such PLM technology.

The identifier-based PLM technology 106 included in each managed device 104 is configured to read the identifier and other PLI information from non-standard cables 108. These non-standard cables 108 are also referred to here as "managed cables" 108.

In general, the identifier-based PLM technology 106 includes a controller or other programmable processor 110 that is configured to communicate captured identifier and other physical layer information to a management system 112 over the network 102. In the example shown in FIG. 1, each controller 110 is communicatively coupled to the network 102 and the management system 112 by including a respective "management" or "non-service" port 114 in the associated managed device 104. Each management port 114 is separate from the "service" ports 116 of that device 104. However, the controller 110 in the managed devices 104 can be communicatively coupled to the network 102 using one or more of the "service" ports 116. Power can be supplied to the identifier-based PLM technology 106 in each managed device 104 in various ways (for example, by connecting the managed device 104 to the standard AC power grid, using Power-Over-Ethernet technology, or in other ways).

Unmanaged cables 118 can also be used with the managed network elements or devices 104. There are two types of "unmanaged" cables 118. One type of unmanaged cable 118 is a standard cable that is not specially configured to be used with any type of identifier-based PLM technology. The other type of unmanaged cable 118 is a managed cable that is configured to be used with a different and incompatible type of identifier-based PLM technology. For example, a cable including only RFID-based PLM technology when connected to a managed device configured for use with EEPROM-based PLM technology is considered an unmanaged cable, and, similarly, a cable including only EEPROM-based PLM technology when connected to a managed device configured for use with RFID-based PLM technology is considered an unmanaged cable.

Examples of cables 108 and 118 include, without limitation, CAT-5, 6, and 7 twisted-pair cables having modular connectors or plugs attached to both ends (in which case, the service ports 116 are implemented using compatible modular jacks) or optical cables having SC, LC, FC, LX.5, MTP, or MPO connectors (in which case, the service ports 116 are implemented using compatible SC, LC, FC, LX.5, MTP, or MPO connectors or adapters). The techniques described here can be used with other types of connectors and cables including, for example, cables terminated with BNC connectors, F connectors, DSX jacks and plugs, bantam jacks and plugs, and MPO and MTP multi-fiber connectors and adapters.

Each of the managed network elements or devices 104 is configured to detect when a cable 108 or 118 is attached or connected to that managed network element or device 104, regardless of whether the cable is a managed cable 108 or an unmanaged cable 118. For example, each service port 116 of the managed device 104 can include one or more electrical contacts or switches that are configured to open or close an electrical circuit when a connector attached to a cable 108 or 118 is inserted into that port 116. This detection can be implemented in other ways (using, for example, sensors or mechanical, electrical, or other switches). Also, it is important to note that this detection is implemented out of band. That is, this detection is not implemented using the standard functionality for communicating data over the service ports 116.

More specifically, in the exemplary embodiment shown in FIG. 1, each of the managed devices 104 comprises a patch panel (and is also referred to here as "managed patch panel" 104). Each managed patch panel 104 is described here, in this exemplary embodiment, as being designed for use with copper twisted-pair CAT-5, 6, and 7 cables typically used to implement ETHERNET local area networks.

Each managed patch panel 104 implements EEPROM-based PLM technology 106. More specifically, in this exemplary embodiment, each managed cable 108 includes a respective storage device (such as an EEPROM) 120 that is attached or integrated into (or is otherwise associated with) a connector 122 attached to each end of that managed cable 108. Each storage device 120 comprises an interface 124 by which power is provided to the storage device 120 and data is read from and written to the storage device 120. In this example, the storage device interface 124 comprises a set of contacts (for example, a power contact for supplying power to the storage device 120, a ground contact for supplying a ground to the storage device 120, and a serial data contact for communicating data to and from the electronic storage device 120 using a serial bus protocol such as the UNI/O bus protocol). In one implementation of this embodiment, the electronic storage device 120 and the interface 124 are implemented using the QUAREO™ electronic identifier technology commercially available from TE Connectivity. The electronic storage device 120 and the interface 124 can be implemented in other ways.

In this exemplary embodiment, the identifier-based PLM technology 106 included in each managed patch panel 104 includes a corresponding storage device interface 128 for each service port 116 of that managed patch panel 104. For each service port 116, the corresponding storage device interface 128 is configured to couple a storage device 120 attached to a connector 122 inserted into that service port 116 to the controller 110 in the managed patch panel 104 so that the controller 110 is able read information stored in the storage device 120 and/or write information to the storage device 120. The storage device interface 128 is compatible with the storage device interface 124 used on the storage device 120. In this example, each storage device interface 128 comprises a set of contacts that corresponds to the set of contacts used on each connector 122 (for example, including power, ground, and serial data contacts). Each contact in the interface 128 of the patch panel 108 is configured to come into physical contact with a corresponding contact used on the connector 122 and create an electrical connection therebetween.

In the exemplary embodiment shown in FIG. 1, one or more of the contacts in the storage device interface 128 for each service port 116 is configured in such a way to change the state of an electrical circuit when a connector is inserted into that service port 116. For example, a conductor used to implement such a contact can be configured and mechanically biased to be in a first position that is associated with a first state (for example, an open state where an electrical connection is not made) when no connector is inserted into the corresponding service port 116, and can be configured and mechanically biased to be moved into a second position that is associated with a second state (for example, a closed state in which an electrical connection is made) when a connector is inserted into the corresponding service port 116. A circuit (not shown) for each such contact is used to develop a first logic state on an input/output (I/O) line associated with that contact when that contact is in the first state and to develop a second logic state on the input/output line associated with that contact when that contact is in a second state. Moreover, each such circuit can also be configured to enable data other than the logic state of the contact to be communicated over that I/O line (for example, each such I/O line can be used to read data from and/or write data to a storage device 120 over that I/O line).

The controller 110 monitors (for example, by polling) the logic state of the various I/O lines to determine when a connector has been inserted into or removed from a given service port 116. When such an insertion or removal occurs, the controller 110 sends a message to the management system 112 informing the management system 112 of that insertion or removal event. Also, when a connector 122 attached to a managed cable 108 is inserted into a service port 116 of a managed patch panel 104, the corresponding controller 110 reads the identifier and other information stored in the storage device 120 attached to or integrated into that connector 122 and communicates that information to the management system 112. The management system 112, when it receives such information read from a storage device 120 associated with a connector 122, stores and/or updates information in a database or other data store 132 maintained by the management system 112. This information is used to identify and track connections that are made between the service ports 116 of the managed patch panels 104.

In this example, each managed patch panel 104 includes one or more light emitting diodes (LEDs) (or other visual indicators) 134 that are associated with each service port 116 of the managed patch panel 104. Each LED 134 is coupled to the controller 110 in the managed patch panel 104 so that the controller 110 (more specifically, the software executing on the controller 110) can actuate the LEDs 134 (for example, by turning the LEDs 134 on or off or flashing or changing the color of the LEDs 134).

In the exemplary embodiment shown in FIG. 1, the management system 112 is implemented as software that executes on one or more computers 136.

In the exemplary embodiment shown in FIG. 1, each computer 136 comprises one or more programmable processors 138 for executing the software. The software comprises program instructions that are stored (or otherwise embodied) on or in an appropriate non-transitory storage medium or media 140 (such as flash or other non-volatile memory, magnetic disc drives, and/or optical disc drives) from which at least a portion of the program instructions are read by the programmable processor 138 for execution thereby. Although the storage media 140 is shown in FIG. 1 as being included in, and local to, the respective computer 136, it is to be understood that remote storage media (for example, storage media that is accessible over the network 102) and/or removable media can also be used. Each computer 136 also includes memory 142 for storing the program instructions (and any related data) during execution by the programmable processor 138. Memory 142 comprises, in one implementation, any suitable form of random access memory (RAM) now known or later developed, such as dynamic random access memory (DRAM). In other embodiments, other types of memory are used. Each computer 136 also includes one or more network interfaces 144 for communicatively coupling the computer 136 to the network 102.

In the example shown in FIG. 1, the management system 112 further includes an electronic work order application 146. The electronic work application 146 is used to construct electronic work orders 148. Each electronic work 148 specifies one or more steps that are to be carried out by a technician at a particular location. For example, an electronic work order 148 can indicate that one or more connections implemented using the ports 116 of the managed patch panels 104 should be added, removed, and/or changed. For steps that involve adding, removing, and/or changing connections made at the ports 116 of the managed patch panels 104, the information that is read from the associated storage devices 120 by the identifier-based PLM functionality 106 in the patch panels 104 and communicated to the management system 112 can be used by the electronic work order application 146 to verify that the specified connection has been added, removed, and/or changed correctly.

The LEDs 134 associated with the service ports 116 of the managed patch panels 104 can be actuated in order to guide a technician in carrying out the steps of electronic work orders 148.

In this example, each electronic work order 148 is communicated to a smartphone 150 (or similar device) that is carried by a technician that has been assigned to carry out that electronic work order 148. In this example, the smartphone 150 is configured to execute a mobile application 152. The mobile application 152 is configured to communicate with the electronic work order application 146 and the management system 112 and to receive the electronic work orders 148. The mobile application 152 comprises program instructions that are stored (or otherwise embodied) on or in an appropriate non-transitory storage medium or media from which at least a portion of the program instructions are read by at least one programmable processor included in the smartphone 150 for execution thereby.

Each electronic work order 148 can be communicated wirelessly to the smartphone 150 over the Internet (for example, via a cellular or wireless local area network to which the smartphone 150 is wirelessly connected). Each electronic work order can also be communicated to the smartphone 150 in other ways (for example, using a wired connection with the smartphone 150).

As noted above, the identifier and other information read from the managed cables 108 is used to identify and track connections made using managed cables 108. However, techniques for identifying and tracking connections that depend on using identifier and other information read from managed cables 108 cannot be used with unmanaged cables 118.

Figure 2:
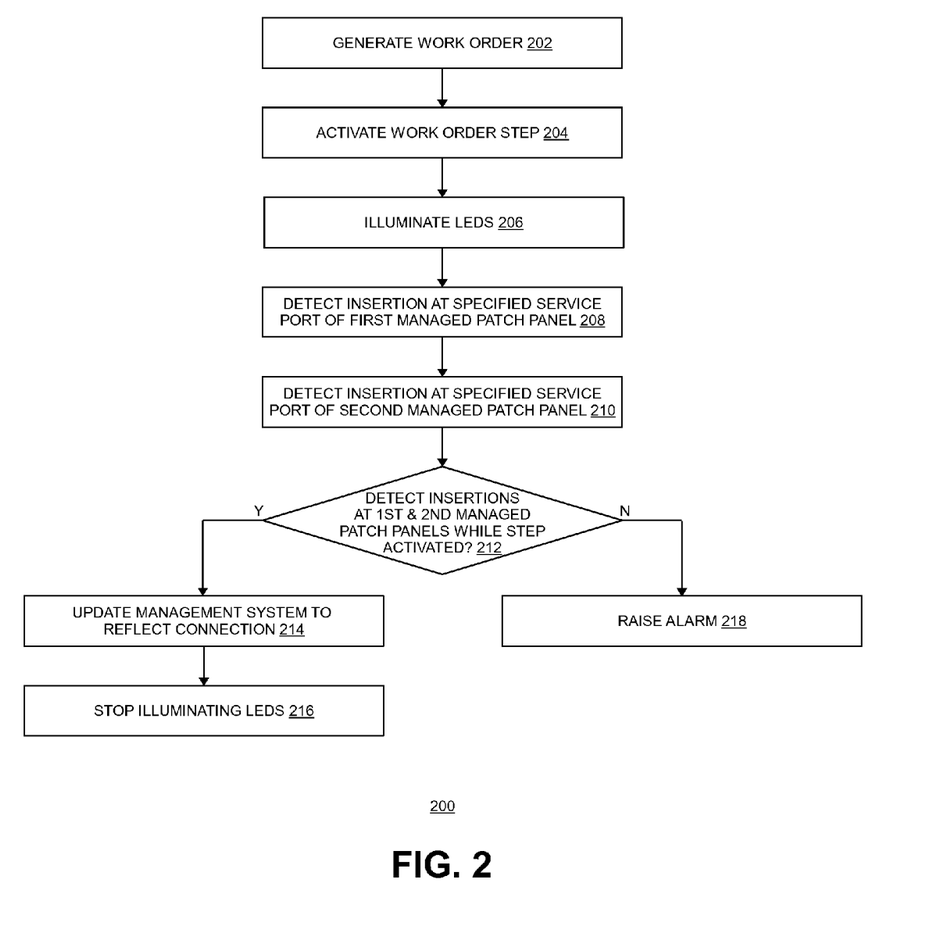
FIG. 2 illustrates one embodiment of a method of identifying a connection made using a cable.

FIG. 2 illustrates one embodiment of a method 200 of identifying a connection made using a cable. The exemplary embodiment of method 200 shown in FIG. 2 is described here as being implemented using the system 100 shown in FIG. 1, though it is to be understood that other embodiments can be implemented in other ways.

Moreover, the blocks of the flow diagram shown in FIG. 2 have been arranged for ease of explanation; however, it is to be understood that this arrangement is merely exemplary, and it should be recognized that the processing associated with method 200 (and the blocks shown in FIG. 2) can occur in any order (for example, using standard event-driven programming techniques).

Method 200 can be used with either a managed cable 108 or an unmanaged cable 118, though method 200 is especially useful for identifying and tracking connections made with an unmanaged cable 118 since the identifier-based PLM technology that is otherwise included in the network 102 is typically designed to identify and track connections made with managed cables 108 and is typically not able to identify and track connections made with unmanaged cables 118. Accordingly, the following description of method 200 is described below as using an unmanaged cable 118, though it is to be understood that method 200 can also be used with managed cables 108 (though it likely would be preferable to use the identifier-based PLM technology to identify and track connections made using managed cables 108).

Method 200 comprises generating a work order 148 that includes a work order step specifying that a service port 116 of a first managed patch panel 104-A is to be connected to a service port 116 of a second managed patch panel 104-B using an unmanaged cable 118 (block 202). In this example, the electronic work order application 146 is used to create the electronic work order 148. The electronic work order 148, in this example, is communicated to a mobile application 152 executing on a smartphone 150 used by a technician that is to carry out the electronic work order 148. The electronic work order 148 can be wirelessly communicated from the electronic work order application 146 to the smartphone 150 (for example, using a cellular or wireless local area network communication link) or using a wired connection to the Internet, a local area network, or a direct connection between the smartphone 150 and the computer 136 on which the electronic work order application 146 executes.

After the electronic work order 148 has been downloaded to the mobile application 152 on the smartphone 150, a technician can use the mobile application 152 to view the electronic work order 148 and the steps included in the electronic work order 148. After the technician has travelled to the location where the first and second managed patch panels 104-A and 104-B are installed, the technician can use the mobile application 152 executing on the smartphone 150 to assist the technician in carrying out the steps in the work order 148.

When the technician is ready to perform the step noted above in connection with block 202, the technician activates that step of the work order (block 204). Activating the work order step involves signaling to the mobile application 152 executing on the smartphone 150 and the management system 112 that the technician is ready to perform that work order step. The technician can do this by providing a suitable input to the mobile application 152 using the smartphone 150. When the mobile application 152 receives such an input, the mobile application 152 sends a message to the management system 112 that indicates that the technician is ready to perform the work order step.

In response to the work order step being activated, the management system 112 illuminates (or otherwise actuates) the LEDs 134 associated with the specified service ports 116

(block 206). That is, the management system 112 sends a message to the controller 110 in the first managed patch panel 104-A indicating that the LED 134 associated with the specified service port 116 included in the first managed patch panel 104-A should be illuminated. In response to receiving such a message, the controller 110 included in the first managed patch panel 104-A illuminates (or otherwise actuate) that LED 134. The same thing is done for the specified service port 116 that is included in the second managed patch panel 104-B. That is, the management system 112 sends a message to the controller 110 in the second managed patch panel 104-B indicating that the LED 134 associated with the specified service port 116 included in the second managed patch panel 104-B should be illuminated. In response to receiving such a message, the controller 110 included in that second managed patch panel 104-B illuminates (or otherwise actuate) that LED 134.

Illuminating the LEDs 134 associated with the specified service ports 116 provides the technician with a visual indication that is intended to assist the technician in locating the specified service ports 116. However, it is to be understood that providing such a visual indication is optional, and it is to possible for the technician to locate the specified service ports 116 in other ways (for example, by looking for labels that are included on the managed patch panels 104-A and 104-B that identify each of the specified service ports 116).

Then, the technician can insert the connector attached to one end of the unmanaged cable 118 into one of the specified service ports 116 and insert the connector attached to the other end of the unmanaged cable 118 into one of the specified service ports 116. The order in which the connections are made can be (but need not be) specified in the work order step.

Method 200 comprises detecting, using the first managed patch panel 104-A, when a connector insertion is made at the specified service port 116 included in the first managed patch panel 104-A (block 208) and detecting, using the second managed patch panel 104-B, when a connector insertion is made at the specified service port 116 included in the second managed patch panel 104-B (block 210). As noted above, the controller 110 in each of the managed patch panels 104-A and 104-B monitors the logic state of the various I/O lines used to couple the PLM technology 106 to the controller 110 in order to determine when a connector has been inserted into or removed from any of the service ports 116. When a connector is inserted into or removed from any of the service ports 116, the controller 110 sends a message to the management application 112 notifying the management system 112 of that fact. The message indicates whether the event was an insertion or a removal and includes information identifying the service port 116 and managed device 104 involved. Also, the message can include information indicating when the particular insertion or removal occurred.

Method 200 further comprises determining if a connector insertion was detected at the specified service port 116 of the first managed patch panel 104-A as occurring during a period when the work order step noted above in connection with block 204 was expected to be performed and if a connector insertion was detected at the specified service port 116 of the second managed patch panel 104-B as occurring during the period when the work order step expected to be performed (checked in block 212). Method 200 further comprises, if both such insertions were detected as occurring during the period when the work order step was expected to be performed, updating the management system 112 to indicate that the specified service ports 116 of the first managed patch panel 104-A and the second managed patch panel 104-B are connected to one another (block 214) and stopping the illumination (or other actuation) of the LEDs 143 associated with the specified service ports 116 (block 216).

In this example, the work order step is expected to be performed while the work order step is activated as described above in connection with block 204. The work order step, after initially being activated, remains activated until the work order step is successfully completed, the technician manually deactivates the work order step using the mobile application 152, or a predetermined period of time elapses without the step being successfully completed.

In this example, the management system 112 is configured to check the insertion and removal messages it receives from the controllers 110 of the first and second managed patch panels 104-A and 104-B. The management system 112 checks to see if it has received an insertion message for the specified service port 116 of the first managed patch panel 104-A that indicates that an insertion occurred at the specified service port 116 while the work order step was activated. The management system 112 also checks to see if it has received an insert message for the specified port 116 of the second managed patch panel 104-B that indicates that an insertion occurred while at the specified service port 116 while the work order step was activated. If the management system 112 receives both such insertion messages, the management system 112 considers the work order step to have been successfully completed and updates the information it maintains to indicate that the specified service ports 116 are connected to one another. In other words, a connection between the two specified ports 116 is inferred from the single-end events (insertion events in this case).

This determination can be made in real-time (for example, where the smartphone 150 is communicatively coupled the management system 112 while the technician is performing the work order step) or can be made after the fact by comparing and reconciling the time information included in the work step activation message and any relevant insertion and removal messages.

If both such insertions were not detected as occurring while that work order step was activated, an alarm can be raised (block 218). The management system 112 can be configured to raise such an alarm in many ways. For example, the management system 112 can be configured to send a message to the mobile application 152 indicating that the management system 112 was not able to validate that the work order step was properly performed. Also, the management system 112 can be configured to add an entry to a log maintained for electronic work orders, where the added entry indicates that the management system 112 was not able to validate that the work order step was properly performed. Also, some other action can be taken if both of the specified insertions were not detected as occurring while the step was activated.

By performing the processing associated with method 200, a connection specified in a work order step can be inferred from single-end insertion events occurring while the work order step was activated. In this way, the management system 112 is able to capture connection information about unmanaged cables 118 that are used with the managed patch panels 104. That is, even though an unmanaged cable 118 is used with the managed patch panels 104 and the identifier-based PLM technology 106 included in them is not able to identify a connection based on identifier information read from the unmanaged cable 118, the management system 112 is nevertheless still able to infer that a connection is made between the two specified ports 116 from the associated single-end insertion events and validate that the electronic work step was properly performed. Also, because such events occur in the context of, and result from the performance of, a step of an electronic work order, the inference of the connection has a higher degree of confidence than would otherwise be the case.

Similar processing can be used for the removal of an unmanaged cable 118.

Figure 3:
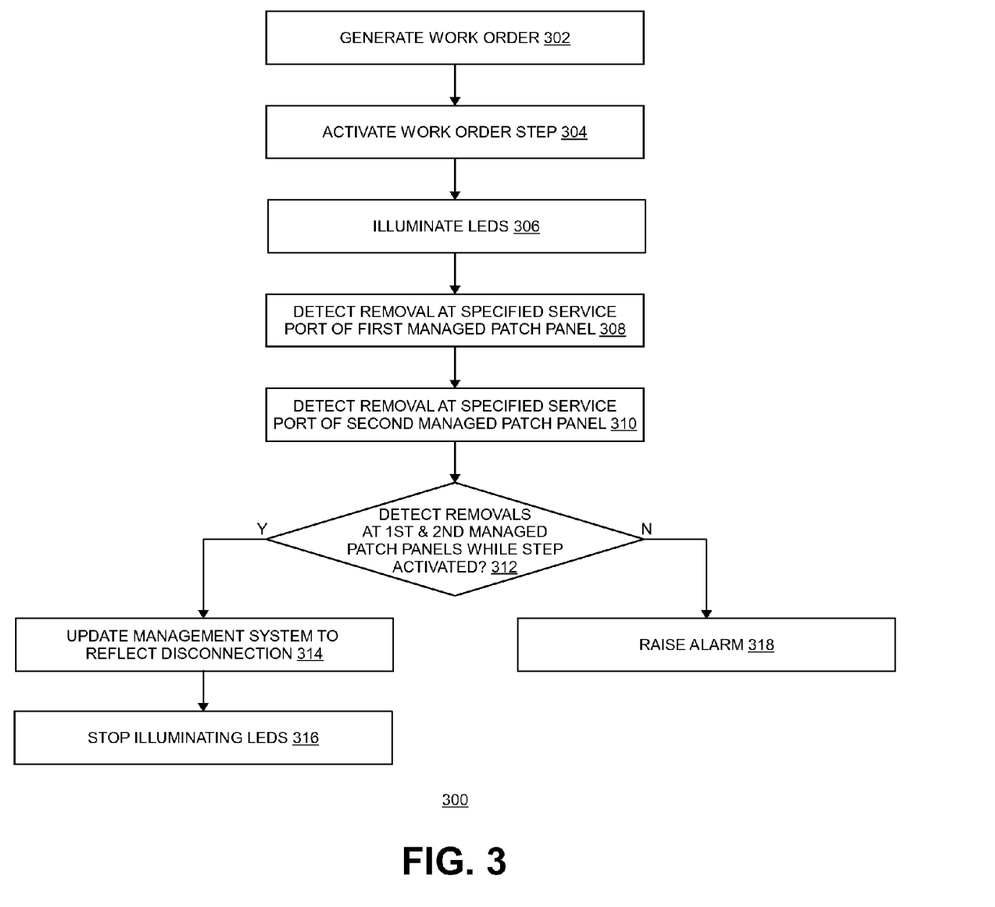
FIG. 3 illustrates one embodiment of a method of performing a work order associated with disconnecting a cable.

FIG. 3 illustrates one embodiment of a method 300 of performing a work order associated with disconnecting a cable. The exemplary embodiment of method 300 shown in FIG. 3 is described here as being implemented using the system 100 shown in FIG. 1, though it is to be understood that other embodiments can be implemented in other ways. Moreover, the blocks of the flow diagram shown in FIG. 3 have been arranged for ease of explanation; however, it is to be understood that this arrangement is merely exemplary, and it should be recognized that the processing associated with method 300 (and the blocks shown in FIG. 3) can occur in any order (for example, using standard event-driven programming techniques).

As with method 200 of FIG. 2, method 300 can be used with either a managed cable 108 or an unmanaged cable 118, though method 300 is especially useful for identifying and tracking connections made with an unmanaged cable 118 since the identifier-based PLM technology that is otherwise included in the network 102 is typically designed to identify and track connections made with managed cables 108 and is typically not able to identify and track connections made with unmanaged cables 118. Accordingly, the following description of method 300 is described below as using an unmanaged cable 118, though it is to be understood that method 300 can also be used with managed cables 108 (though it likely would be preferable to use the identifier-based PLM technology to identify and track connections made using managed cables 108).

In this example, method 300 is performed after a connection is made between a service port 116 of a first managed patch panel 104-A and a service port 116 of a second managed patch panel 104-B using an unmanaged cable 118.

Method 300 comprises generating a work order 148 that includes a work order step specifying that the service port 116 of the first managed patch panel 104-A is to be disconnected from the service port 116 of the second managed patch panel 104-B (block 302). In this example, the electronic work order application 146 is used to generate the electronic work order 148. The electronic work order 148, in this example, is communicated to a mobile application 152 executing on a smartphone 150. The electronic work order 148 can be wirelessly communicated from the electronic work order application 146 (for example, using a cellular or wireless local area network communication link) or using a wired connection to the Internet, local area network, or a wired direct connection between the smartphone 150 and the computer 136 on which the electronic work order application 146 executes.

After the electronic work order 148 has been downloaded to the mobile application 152 on the smartphone 150, a technician can use the mobile application 152 to view the electronic work order 148 and the steps included in the electronic work order 148. After the technician has travelled to the location where the first and second managed patch panels 104-A and 104-B are installed, the technician can use the mobile application 152 executing on the smartphone 150 to assist the technician in carrying out the steps in the work order 148.

When the technician is ready to perform the step noted above in connection with block 302, the technician activates that step of the work order (block 304). This can be done as described above in connection with block 204 of method 200.

In response to the work order step being activated, the management system 112 illuminates (or otherwise actuates) the LEDs 134 associated with the specified service ports 116 (block 306). This can be done as described above in connection with block 206 of method 200.

Illuminating the LEDs 134 associated with the specified service ports 116 is intended to provide the technician with a visual indication in order to assist the technician in locating the specified service ports 116. However, it is to be understood that providing such a visual indication is optional, and it is to possible for the technician to locate the specified service ports 116 in other ways (for example, by looking for labels that are included on the managed patch panels 104-A and 104-B that identify each of the specified service ports 116).

Then, the technician can disconnect the unmanaged cable 118 from the specified service port 116 of the first managed patch panel 104-A and from the specified service port 116 of the second managed patch panel 104-B. The order in which the disconnections are performed can be (but need not be) specified in the work order step.

Method 300 comprises detecting, using the first managed device 104-A, when a connector removal occurs at the specified service port 116 included in the first managed device 104-A (block 308) and detecting, using the second managed patch panel 104-B, when a connector removal occurs at the specified service port 116 included in the second managed patch panel 104-B (block 310). As noted above, the controller 110 in each of the managed patch panels 104-A and 104-B monitors the logic state of the various I/O lines used to couple the PLM technology 106 to the controller 110 in order to determine when a connector has been inserted into or removed from any of the service ports 116. When a connector is inserted into or removed from any of the service ports 116, the controller 110 sends a message to the management application 112 notifying the management system 112 of that fact.

Method 300 further comprises determining if a connector removal was detected at the specified service port 116 of the first managed patch panel 104-A as occurring during a period when the work order step noted above in connection with block 302 was expected to be performed and if a connector removal was detected at the specified service port 116 of the second managed patch panel 104-B as occurring during the period when the work order step was expected to be performed (checked in block 312). Method 300 further comprises, if both such removals were detected as occurring during the period when the work order step was expected to be performed, updating the management system 112 to indicate that the specified service ports 116 of the first managed patch panel 104-A and the second managed patch panel 104-B are not connected to one another (block 314) and stopping the illumination (or other actuation) of the LEDs 143 associated with the specified service ports 116 (block 316).

In this example, the work order step is expected to be performed while the work order step is activated as described above in connection with block 304. The work order step, after initially being activated, remains activated until the work order step is successfully completed, the technician manually deactivates the work order step using the mobile application 152, or a predetermined period of time elapses without the step being successfully completed.

In this example, the management system 112 is configured to check the insertion and removal messages it receives from the controllers 110 of the first and second managed patch panels 104-A and 104-B. The management system 112 checks to see if it has received a removal message for the specified service port 116 of the first managed patch panel 104-A that indicates that a removal occurred at the specified service port 116 while the work order step was activated. The management system 112 also checks to see if it has received a removal message for the specified port 116 of the second managed patch panel 104-B that indicate that a removal occurred at the specified service port 116 while the work order step was activated. If the management system 112 receives both such removal messages, the management system 112 considers the work order step to have been successfully completed and updates the information it maintains to indicate that the specified service ports 116 are not connected to one another. In other words, the disconnection of the two specified ports 116 is inferred from the single-end events (removal events in this case).

This determination can be made in real-time (for example, where the smartphone 150 is communicatively coupled the management system 112 while the technician is performing the work order step) or can be made after the fact by comparing and reconciling the time information included in the work step activation message and any relevant insertion and removal messages.

If both such removals were not detected as occurring while that work order step was activated, an alarm can be raised (block 318). The management system 112 can be configured to raise such an alarm in many ways (for example, the ways noted above in connection with block 216 of FIG. 2).

By performing the processing associated with method 300, a disconnection specified in a work order step can be inferred from single-end removal events occurring while the work order step was activated. In this way, the management system 112 is able to capture disconnection information about unmanaged cables 118 that are used with the managed patch panels 104. That is, even though an unmanaged cable 118 is used with the managed patch panels 104 and the identifier-based PLM technology 106 included in them is not able to identify a disconnection based on identifier information read from the unmanaged cable 118, the management system 112 is nevertheless still able to infer that a disconnection of the two specified ports 116 occurred from the associated single-end removals events and validate that the electronic work step was properly performed. Also, because such events occur in the context of, and result from the performance of, a step of an electronic work order, the inference of the disconnection has a higher degree of confidence than would otherwise be the case.

Although methods 200 and 300 are shown and described separately for ease of explanation, it is to be understood that the processing of method 200 and 300 can be combined in various ways. Also, as noted above, the blocks of the flow diagrams shown in FIGS. 2 and 3 have been arranged for ease of explanation; however, it is to be understood that this arrangement is merely exemplary, and it should be recognized that the processing associated with methods 200 an 300 (and the blocks shown in FIGS. 2 and 3) can occur in any order (for example, using standard event-driven programming techniques).

Moreover, although description of method 200 and 300 refer to the "insertion" and "removal" of connectors, respectively, from the specified service ports, it is to be understood that the methods 200 and 300 can be implemented using other ways of connecting and disconnecting, respectively, a cable from the specified managed network element.

Also, although the exemplary embodiment shown in FIG. 1 is described above as being implemented using managed patch panels 104 configured for use with CAT-5, CAT-6, and CAT-7 twisted-pair copper cables and EEPROM-based PLM technology, it is to be understood that the techniques described here can be used with other managed network elements, cables, and PLM technology (such as, for example, optical distribution frames, splitter trays, or patch panels configured for use with fiber optic cables and/or using RFID-based PLM technology).

A number of embodiments have been described. Nevertheless, it will be understood that various modifications to the described embodiments may be made without departing from the spirit and scope of the claimed invention.

EXAMPLE EMBODIMENTS

Example 1 includes a method comprising: generating a first work order comprising a first work order step specifying that a port of a first network element is to be connected to a port of a second network element using a cable; detecting, using the first network element, when a connection is made at the specified port of the first network element; detecting, using the second network element, when a connection is made at the specified port of the second network element; and if the first network element detects a connection made at the specified port of the first network element during a period in which the first work order step of the first work order was expected to be performed and the second network element detects a connection made at the specified port of the second network element during the period in which the first work order step of the first work order was expected to be performed, updating a management system to indicate that the specified port of the first network element is connected to the specified port of the second network element.

Example 2 includes the method of Example 1, further comprising: if after connecting the specified port of the first network element to the specified port of the second network element using the cable: generating a second work order comprising a second work order step specifying that the specified port of the first network element is to be disconnected from the specified port of the second network element; detecting, using the first network element, when a disconnection is made at the specified port of the first network element; detecting, using the second network element, when a disconnection is made at the specified port of the second network element; and if the first network element detects a disconnection made at the specified port of the first network element during a period in which the second work order step of the second work order was expected to be performed and the second network element detects a disconnection made at the specified port of the second network element during the period in which the second work order step of the second work order was expected to be performed, updating a management system to indicate that the specified port of the first network element is not connected to the specified port of the second network element.

Example 3 includes the method of any of the Examples 1-2, wherein the cable comprises an unmanaged cable.

Example 4 includes the method of any of the Examples 1-3, wherein the cable comprises at least one of a fiber optic cable and a copper cable.

Example 5 includes the method of any of the Examples 1-4, wherein the first network element and the second network element comprise first and second managed network elements, respectively.

Example 6 includes the method of any of the Examples 1-5, wherein the first and second network elements comprise at least one of a patch panel, an optical distribution frame, a splitter tray, a switch, a router.

Example 7 includes the method of any of the Examples 1-6, wherein each of the first and second network elements includes at least one of EEPROM-based PLM technology and RFID PLM technology.

Example 8 includes a method of identifying a disconnection of a specified port of a first network element from a specified port of a second network element, the method comprising: if after the port of the first network element is connected to the port of the second network element using a cable: generating a first work order comprising a first work order step specifying that the port of the first network element is to be disconnected from the port of the second network element; detecting, using the first network element, when a disconnection is made at the specified port of the first network element; detecting, using the second network element, when a disconnection is made at the specified port of the second network element; and if the first network element detects a disconnection made at the specified port of the first network element during a period in which the first work order step of the first work order was expected to be performed and the second network element detects a disconnection made at the specified port of the second network element during the period in which the first work order step of the first work order was expected to be performed, updating a management system to indicate that the specified port of the first network element is not connected to the specified port of the second network element.

Example 9 includes a system comprising: a first network element comprising at least one port, wherein the first network element is configured to detect when a cable is connected to the port of the first network element; a second network element comprising at least one port, wherein the second network element is configured to detect when a cable is connected to the port of the second network element; and a management system communicatively coupled to the first network element and the second network element; wherein the management system is configured to generate a first work order comprising a first work order step specifying that the port of the first network element is to be connected to the port of the second network element using a cable; and wherein the management system is configured to update information maintained by the management system to indicate that the specified port of the first network element is connected to the specified port of the second network element if the management system receives a message indicating that a connection was detected at the specified port of the first network element during a period in which the first work order step of the first work order is expected to be performed and receives a message indicating that a connection was detected at the specified port of the second network element during the period in which the first work order step of the first work order was expected to be performed.

Example 10 includes the system of Example 9, wherein the management system is configured to generate a second work order comprising a second work order step specifying that the port of the first network element is to be disconnected from the port of the second network element; wherein the first network element is configured to detect when a disconnection is made at the specified port of the first network element; wherein the second network element is configured to detect when a disconnection is made at the specified port of the second network element; and wherein the management system is configured to update information maintained by the management system to indicate that the specified port of the first network element has been disconnected from the specified port of the second network element if the management system receives a message indicating that a disconnection was detected at the specified port of the first network element during a period in which the second work order step of the second work order was expected to be performed and receives a message indicating that a disconnection was detected at the specified port of the second network element during the period in which the second work order step of the second work order was expected to be performed.

Example 11 includes the system of any of the Examples 9-10, wherein the cable comprises an unmanaged cable.

Example 12 includes the system of any of the Examples 9-11, wherein the cable comprises at least one of a fiber optic cable and a copper cable.

Example 13 includes the system of any of the Examples 9-12, wherein the first network element and the second network element comprise first and second managed network elements, respectively.

Example 14 includes the system of any of the Examples 9-13, wherein the first and second network elements comprise at least one of a patch panel, an optical distribution frame, a splitter tray, a switch, a router.

Example 15 includes the system of any of the Examples 9-14, wherein each of the first and second network elements includes at least one of EEPROM-based PLM technology and RFID PLM technology.

Example 16 includes the system of any of the Examples 9-15, wherein the management system is configured to send the first work order to a mobile device.

Example 17 includes a system comprising: a first network element comprising at least one port, wherein the first network element is configured to detect when a cable is disconnected from the port of the first network element; a second network element comprising at least one port, wherein the second network element is configured to detect when a cable is disconnected from the port of the second network element; and a management system communicatively coupled to the first network element and the second network element; wherein the management system is configured to generate a first work order comprising a first work order step specifying that the port of the first network element is to be disconnected from the port of the second network element; and wherein the management system is configured to update information maintained by the management system to indicate that the specified port of the first network element has been disconnected from the specified port of the second network element if the management system receives a message indicating that a disconnection was detected at the specified port of the first network element during a period in which the first work order step of the first work order was expected to be performed and receives a message indicating that a disconnection was detected at the specified port of the second network element during the period in which the first work order step of the first work order was expected to be performed.

Example 18 includes a program product for identify a connection between a specified port of a first network element and a specified port of a second network element, tangibly stored on a non-transitory storage medium, comprising instructions operable to cause at least one programmable processor to: generate a work order comprising a work order step specifying that the specified port of the first network element is to be connected to the specified port of the second network element using a cable; in connection with a connection being made at the specified port of the first network element specified in the work order step, receiving information indicating that the connection has been made at the specified port of the first network element; in connection with a connection being made at the specified port of the second network element, receiving information indicating that the connection has been made at the specified port of the second network element; and if information is received indicating that a connection has been made at the specified port of the first network element during a period in which the work order step of the work order is expected to be performed and information is received indicating that a connection has been made at the specified port of the second network element during the period in which the work order step of the work order is expected to be performed, updating connection information for the first network element and the second network element to indicate that the specified port of the first network element is connected to the specified port of the second network element.

Example 19 includes the program product of Example 18, wherein the instructions are further operable to cause the at least one programmable processor to: generate a second work order comprising a second work order step specifying that the specified port of the first network element is to be disconnected from the specified port of the second network element; in connection with a disconnection being made at the specified port of the first network element, receiving information indicating that the disconnection has been made at the specified port of the first network element; in connection with a disconnection being made at the specified port of the second network element, receiving information indicating that the disconnection has been made at the specified port of the second network element; and if information is received indicating that a disconnection has been made at the specified port of the first network element during a period in which the second work order step of the second work order was expected to be performed and information is received indicating that a disconnection has been made at the specified port of the second network element during the period in which the second work order step of the second work order was expected to be performed, updating connection information for the first network element and the second network element to indicate that the specified port of the first network element is disconnected from the specified port of the second network element.

Example 20 includes the program product of any of the Examples 18-19, wherein the instructions are further operable to cause the at least one programmable processor to: send the first work order to a mobile device.

The invention claimed is:

1. A method comprising:
   generating a first work order comprising a first work order step specifying that a port of a first network element is to be connected to a port of a second network element using a cable;
   detecting, using the first network element, when a connection is made at the specified port of the first network element;
   detecting, using the second network element, when a connection is made at the specified port of the second network element; and
   if the first network element detects the connection made at the specified port of the first network element during a period in which the first work order step of the first work order was expected to be performed and the second network element detects the connection made at the specified port of the second network element during the period in which the first work order step of the first work order was expected to be performed, updating a management system to indicate that the specified port of the first network element is connected to the specified port of the second network element.

2. The method of claim 1, further comprising:
   if after connecting the specified port of the first network element to the specified port of the second network element using the cable:
      generating a second work order comprising a second work order step specifying that the specified port of the first network element is to be disconnected from the specified port of the second network element;
      detecting, using the first network element, when a disconnection is made at the specified port of the first network element;
      detecting, using the second network element, when a disconnection is made at the specified port of the second network element; and
      if the first network element detects the disconnection made at the specified port of the first network element during a second period in which the second work order step of the second work order was expected to be performed and the second network element detects the disconnection made at the specified port of the second network element during the second period in which the second work order step of the second work order was expected to be performed, updating a management system to indicate that the specified port of the first network element is not connected to the specified port of the second network element.

3. The method of claim 1, wherein the cable comprises an unmanaged cable.

4. The method of claim 1, wherein the cable comprises at least one of a fiber optic cable and a copper cable.

5. The method of claim 1, wherein the first network element and the second network element comprise first and second managed network elements, respectively.

6. The method of claim 1, wherein the first and second network elements comprise at least one of a patch panel, an optical distribution frame, a splitter tray, a switch, and a router.

7. The method of claim 1, wherein each of the first and second network elements includes at least one of EEPROM-based PLM technology and RFID PLM technology.

8. A method of identifying a disconnecting of a specified port of a first network element from a specified port of a second network element, the method comprising:
   if after the port of the first network element is connected to the port of the second network element using a cable:
      generating a first work order comprising a first work order step specifying that the port of the first network element is to be disconnected from the port of the second network element;
      detecting, using the first network element, when a disconnection is made at the specified port of the first network element;

detecting, using the second network element, when a disconnection is made at the specified port of the second network element; and if the first network element detects the disconnection made at the specified port of the first network element during a period in which the first work order step of the first work order was expected to be performed and the second network element detects the disconnection made at the specified port of the second network element during the period in which the first work order step of the first work order was expected to be performed, updating a management system to indicate that the specified port of the first network element is not connected to the specified port of the second network element.

9. A system comprising:

a first network element comprising at least one port, wherein the first network element is configured to detect when a cable is connected to the port of the first network element;

a second network element comprising at least one port, wherein the second network element is configured to detect when a cable is connected to the port of the second network element; and a management system communicatively coupled to the first network element and the second network element;

wherein the management system is configured to generate a first work order comprising a first work order step specifying that the port of the first network element is to be connected to the port of the second network element using a cable; and wherein the management system is configured to update information maintained by the management system to indicate that the specified port of the first network element is connected to the specified port of the second network element if the management system receives a message indicating that a connection was detected at the specified port of the first network element during a period in which the first work order step of the first work order is expected to be performed and receives a message indicating that a connection was detected at the specified port of the second network element during the period in which the first work order step of the first work order was expected to be performed.

10. The system of claim 9, wherein the management system is configured to generate a second work order comprising a second work order step specifying that the port of the first network element is to be disconnected from the port of the second network element;

wherein the first network element is configured to detect when a disconnection is made at the specified port of the first network element;

wherein the second network element is configured to detect when a disconnection is made at the specified port of the second network element; and wherein the management system is configured to update information maintained by the management system to indicate that the specified port of the first network element has been disconnected from the specified port of the second network element if the management system receives a message indicating that the disconnection was detected at the specified port of the first network element during a period in which the second work order step of the second work order was expected to be performed and receives a message indicating that the disconnection was detected at the specified port of the second network element during the period in which the second work order step of the second work order was expected to be performed.

11. The system of claim 9, wherein the cable comprises an unmanaged cable.

12. The system of claim 9, wherein the cable comprises at least one of a fiber optic cable and a copper cable.

13. The system of claim 9, wherein the first network element and the second network element comprise first and second managed network elements, respectively.

14. The system of claim 9, wherein the first and second network elements comprise at least one of a patch panel, an optical distribution frame, a splitter tray, a switch, and a router.

15. The system of claim 9, wherein each of the first and second network elements includes at least one of EEPROM-based PLM technology and RFID PLM technology.

16. The system of claim 9, wherein the management system is configured to send the first work order to a mobile device.

17. A system comprising:

a first network element comprising at least one port, wherein the first network element is configured to detect when a cable is disconnected from the port of the first network element;

a second network element comprising at least one port, wherein the second network element is configured to detect when a cable is disconnected from the port of the second network element; and a management system communicatively coupled to the first network element and the second network element;

wherein the management system is configured to generate a first work order comprising a first work order step specifying that the port of the first network element is to be disconnected from the port of the second network element; and wherein the management system is configured to update information maintained by the management system to indicate that the specified port of the first network element has been disconnected from the specified port of the second network element if the management system receives a message indicating that a disconnection was detected at the specified port of the first network element during a period in which the first work order step of the first work order was expected to be performed and receives a message indicating that a disconnection was detected at the specified port of the second network element during the period in which the first work order step of the first work order was expected to be performed.

18. A program product for identifying a connecting of a specified port of a first network element and a specified port of a second network element, tangibly stored on a non-transitory storage medium, comprising instructions operable to cause at least one programmable processor to:

generate a work order comprising a work order step specifying that the specified port of the first network element is to be connected to the specified port of the second network element using a cable;

in connection with a connection being made at the specified port of the first network element, receiving information indicating that the connection has been made at the specified port of the first network element;

in connection with a connection being made at the specified port of the second network element, receiving information indicating that the connection has been made at the specified port of the second network element; and if information is received indicating that the connection has been made at the specified port of the first network element during a period in which the work order step of the work order is expected to be performed and information is received indicating that the connection has been made at the specified port of the second network element during the period in which the work order step of the work order is expected to be performed, updating connection information for the first network element and the second network element to indicate that the specified port of the first network element is connected to the specified port of the second network element.

19. The program product of claim 18, wherein the instructions are further operable to cause the at least one programmable processor to:
generate a second work order comprising a second work order step specifying that the specified port of the first network element is to be disconnected from the specified port of the second network element;
in connection with a disconnection being made at the specified port of the first network element, receiving information indicating that the disconnection has been made at the specified port of the first network element;
in connection with a disconnection being made at the specified port of the second network element, receiving information indicating that the disconnection has been made at the specified port of the second network element; and
if information is received indicating that the disconnection has been made at the specified port of the first network element during a period in which the second work order step of the second work order was expected to be performed and information is received indicating that the disconnection has been made at the specified port of the second network element during the period in which the second work order step of the second work order was expected to be performed, updating connection information for the first network element and the second network element to indicate that the specified port of the first network element is disconnected from the specified port of the second network element.

20. The program product of claim 18, wherein the instructions are further operable to cause the at least one programmable processor to:
send the first work order to a mobile device.

21. A method comprising:
generating a first work order comprising a first work order step specifying that a port of a first network element is to be connected to a port of a second network element using a cable;
detecting, using the first network element, that a connection has been made at the specified port of the first network element;
detecting, using the second network element, that a connection has been made at the specified port of the second network element; and
if the first network element detects the connection made at the specified port of the first network element during a period in which the first work order step of the first work order was expected to be performed and the second network element detects the connection made at the specified port of the second network element during the period in which the first work order step of the first work order was expected to be performed, updating a management system to indicate that the specified port of the first network element is connected to the specified port of the second network element.

22. The method of claim 21, further comprising:
if after connecting the specified port of the first network element to the specified port of the second network element using the cable:
generating a second work order comprising a second work order step specifying that the specified port of the first network element is to be disconnected from the specified port of the second network element;
detecting, using the first network element, that a disconnection has been made at the specified port of the first network element;
detecting, using the second network element, that a disconnection has been made at the specified port of the second network element; and
if the first network element detects that the disconnection has been made at the specified port of the first network element during a second period in which the second work order step of the second work order was expected to be performed and the second network element detects that the disconnection has been made at the specified port of the second network element during the second period in which the second work order step of the second work order was expected to be performed, updating a management system to indicate that the specified port of the first network element is not connected to the specified port of the second network element.

23. The method of claim 21, wherein the cable comprises an unmanaged cable.

24. The method of claim 21, wherein the cable comprises at least one of a fiber optic cable and a copper cable.

25. The method of claim 21, wherein the first network element and the second network element comprise first and second managed network elements, respectively.

26. The method of claim 21, wherein the first and second network elements comprise at least one of a patch panel, an optical distribution frame, a splitter tray, a switch, and a router.

27. The method of claim 21, wherein each of the first and second network elements includes at least one of EEPROM-based PLM technology and RFID PLM technology.

28. A method of identifying a disconnecting of a specified port of a first network element from a specified port of a second network element, the method comprising:
if after the port of the first network element is connected to the port of the second network element using a cable:
generating a first work order comprising a first work order step specifying that the port of the first network element is to be disconnected from the port of the second network element;
detecting, using the first network element, that a disconnection has been made at the specified port of the first network element;
detecting, using the second network element, that a disconnection has made at the specified port of the second network element; and
if the first network element detects that the disconnection has been made at the specified port of the first network element during a period in which the first work order step of the first work order was expected to be performed and the second network element detects that the disconnection has been made at the specified port of the second network element during the period in which the first work order step of the first work order was expected to be performed, updating a management system to indicate that the specified port of the first network element is not connected to the specified port of the second network element.

29. A system comprising:
a first network element comprising at least one port, wherein the first network element is configured to detect that a respective cable connector has been connected to the port of the first network element;
a second network element comprising at least one port, wherein the second network element is configured to detect that a respective cable connector has been connected to the port of the second network element; and
a management system communicatively coupled to the first network element and the second network element;
wherein the management system is configured to generate a first work order comprising a first work order step specifying that the port of the first network element is to be connected to the port of the second network element using a cable; and
wherein the management system is configured to update information maintained by the management system to indicate that the specified port of the first network element is connected to the specified port of the second network element if the management system receives a message indicating that a connection has been detected at the specified port of the first network element during a period in which the first work order step of the first work order is expected to be performed and receives a message indicating that a connection has been detected at the specified port of the second network element during the period in which the first work order step of the first work order was expected to be performed.

30. The system of claim 29, wherein the management system is configured to generate a second work order comprising a second work order step specifying that the port of the first network element is to be disconnected from the port of the second network element;
wherein the first network element is configured to detect that a disconnection has been made at the specified port of the first network element;
wherein the second network element is configured to detect that a disconnection has been made at the specified port of the second network element; and
wherein the management system is configured to update information maintained by the management system to indicate that the specified port of the first network element has been disconnected from the specified port of the second network element if the management system receives a message indicating that the disconnection was detected at the specified port of the first network element during a period in which the second work order step of the second work order was expected to be performed and receives a message indicating that the disconnection was detected at the specified port of the second network element during the period in which the second work order step of the second work order was expected to be performed.

31. The system of claim 29, wherein the cable comprises an unmanaged cable.

32. The system of claim 29, wherein the cable comprises at least one of a fiber optic cable and a copper cable.

33. The system of claim 29, wherein the first network element and the second network element comprise first and second managed network elements, respectively.

34. The system of claim 29, wherein the first and second network elements comprise at least one of a patch panel, an optical distribution frame, a splitter tray, a switch, and a router.

35. The system of claim 29, wherein each of the first and second network elements includes at least one of EEPROM-based PLM technology and RFID PLM technology.

36. The system of claim 29, wherein the management system is configured to send the first work order to a mobile device.

37. A system comprising:
a first network element comprising at least one port, wherein the first network element is configured to detect the a cable connector has been disconnected from the port of the first network element;
a second network element comprising at least one port, wherein the second network element is configured to detect that a cable connector has been disconnected from the port of the second network element; and
a management system communicatively coupled to the first network element and the second network element;
wherein the management system is configured to generate a first work order comprising a first work order step specifying that the port of the first network element is to be disconnected from the port of the second network element; and
wherein the management system is configured to update information maintained by the management system to indicate that the specified port of the first network element has been disconnected from the specified port of the second network element if the management system receives a message indicating that the disconnection was detected at the specified port of the first network element during a period in which the first work order step of the first work order was expected to be performed and receives a message indicating that the disconnection was detected at the specified port of the second network element during the period in which the first work order step of the first work order was expected to be performed.

38. A program product for identifying a connecting of a specified port of a first network element and a specified port of a second network element, tangibly stored on a non-transitory storage medium, comprising instructions operable to cause at least one programmable processor to:
generate a work order comprising a work order step specifying that the specified port of the first network element is to be connected to the specified port of the second network element using a cable;
in connection with a connection being made at the specified port of the first network element, receiving information indicating that the connection has been made at the specified port of the first network element;
in connection with a connection being made at the specified port of the second network element, receiving information indicating that the connection has been made at the specified port of the second network element; and
if information is received indicating that the connection has been made at the specified port of the first network element during a period in which the work order step of the work order is expected to be performed and information is received indicating that the connection has been made at the specified port of the second network element during the period in which the work order step of the work order is expected to be performed, updating connection information for the first network element and the second network element to indicate that the specified port of the first network element is connected to the specified port of the second network element.

39. The program product of claim 38, wherein the instructions are further operable to cause the at least one programmable processor to:
   generate a second work order comprising a second work order step specifying that the specified port of the first network element is to be disconnected from the specified port of the second network element;
   in connection with a disconnection being made at the specified port of the first network element, receiving information indicating that the disconnection has been made at the specified port of the first network element;
   in connection with a disconnection being made at the specified port of the second network element, receiving information indicating that the disconnection has been made at the specified port of the second network element; and
   if information is received indicating that the disconnection has been made at the specified port of the first network element during a period in which the second work order step of the second work order was expected to be performed and information is received indicating that the disconnection has been made at the specified port of the second network element during the period in which the second work order step of the second work order was expected to be performed, updating connection information for the first network element and the second network element to indicate that the specified port of the first network element is disconnected from the specified port of the second network element.

40. The program product of claim 38, wherein the instructions are further operable to cause the at least one programmable processor to:
   send the first work order to a mobile device.

* * * * *